United States Patent Office 3,115,482
Patented Dec. 24, 1963

3,115,482
ALIPHATIC POLYALKYLENAMIDES AND
POLYMERS THEREFROM
George H. Smith, Maplewood, Minn., assignor to Minnesota Mining and Manufacturing Company, St. Paul, Minn., a corporation of Delaware
No Drawing. Filed Sept. 16, 1959, Ser. No. 840,255
12 Claims. (Cl. 260—78)

This invention relates to new compounds and the method of making same. In one aspect this invention relates to stable and pure polyalkylenamides and their derivatives. In still another aspect this invention relates to polyalkylenamides and homopolymers and copolymers thereof. This application is a continuation-in-part of my prior and copending application Serial No. 645,005, filed March 11, 1957, now abandoned.

A few polyalkylenamides have been disclosed in the prior art by their empirical formula but because of their instability because of their impure state no particular utility existed for such compounds. As produced, these aliphatic polyalkylenamides are in admixture with by-products and impurities, and as a result, these polyalkylenamides react spontaneously with the by-products and impurities to an insoluble resin or isomerize to produce mixtures of unidentifiable compounds lacking technological or commercial interest. In general, therefore, polyalkylenamides have been considered laboratory or technical curiosities rather than useful compounds. Purification of such compounds as produced has apparently been impossible because of their instability. In their impure state, they decompose upon melting or distillation and apparently could not be solvent extracted from their impurities because of the similarity in solubility characteristics.

An object of this invention is to produce for the first time substantially stable and substantially pure polyalkylenamides.

Another object of this invention is to produce new and stable compositions and mixtures.

Still another object of this invention is to produce new derivatives and polymers of polyalkylenamides.

Another object of this invention is to provide novel and useful organic solutions of polyalkylenamides providing a stable form of said compounds.

It is still another object of the present invention to provide relatively stable, pure, reactive saturated monomers capable of being controllably polymerized to produce useful homo- and copolymers.

It is a further object of the present invention to provide suitably pure and stable aliphatic polyalkylenamides which can be stored over extended periods of time under normal storage conditions without undergoing conversion to other forms or decomposition, and which may be controllably polymerized when desired.

Another object of this invention is to produce aliphatic polyalkylenamides in liquid form.

Yet another object of this inveniton is to produce aliphatic polyethylenamides.

Still another object of this invention is to produce aliphatic, alkyl-substituted polyethylenamides.

It is also an object of this invention to provide homopolymers and interpolymers of aliphatic polyalkylenamides.

An additional object is to provide surfaces coated with polymerized aliphatic alkylenamides.

A further object is to provide a new process for producing polyalkylenamides.

Various other objects and advantages of this invention will become apparent to those skilled in the art from the accompanying description and disclosure.

The new compounds of this invention which are in substantially pure form and are stable are aliphatic polyalkylenamides, in which at least 85 percent of the amide groups are in the form of azirane rings. Preferably these aliphatic polyalkylenamides are aliphatic N,N'-bis-1,2-alkylenamides, the alkylene groups each generally having up to 6 carbon atoms, e.g. ethylene, propylene, and n-butylene, and preferably not more than 4 carbon atoms. The most preferred aliphatic polyalkylenamides of this invention are N,N'-bis-1,2-alkylenamides of aliphatic dicarboxylic acids, which acids preferably contain a total of from 6 to about 20 carbon atoms. When the alkylenamido groups contain three or more carbon atoms, their symmetry, as well as that of the molecule, is reduced and the melting point is usually correspondingly lower. In fact, many of these alkyl substituted polyethylenamides, such as N,N'-bis-1,2-butylenisosebacamide, N,N'-bis-1,2-propylenisosebacamide, etc., are normally liquid in form.

The most classical methods for producing the aliphatic polyalkylenamides would be by the reaction of an aliphatic, hydrocarbon polycarboxylic acid chloride with an alkylene imine in the presence of a hydrogen chloride acceptor under anhydrous conditions or in aqueous reaction medium. Although such methods may result in a fair conversion, the product is at best an impure, unstable mixture of the polyalkylenamide and by-products, such as the acceptor chloride, beta-chloropolyethylamide and beta-hydroxypolyethylamide, which mixture contains increasing amounts of isomers and addition products and negligible amounts, if any, of the desired polyalkylenamide. The organic by-products are the result of the opening of the imine ring by the hydrogen chloride and hydrolysis by water. In addition to contaminating the product, these by-products cause further degradation of the desired aliphatic polyalkylenamide. On moderate heating the mixture is spontaneously and sometimes violently converted to other materials, most of which are unidentifiable.

It has been found in accordance with this invention that substantialy pure and stable aliphatic polyalkylenamides can be produced directly if a water-immiscible organic solvent for the polyalkylenamide is present in addition to an aqueous phase. Although the lower members of aliphatic bis-alkylenamide series, i.e. produced from aliphatic dicarboxylic acids having about 6 carbon atoms, are water soluble, use of a water-immiscible organic solvent in which these aliphatic bis-alkylenamides are more readily soluble than in the aqueous phase effectively concentrates the desired products in the organic phase and prevents the formation of undesirable by-products mentioned above. The hydrogen chloride released from the reaction is confined to the aqueous phase and the product in the organic phase is effectively isolated from the hydrogen chloride by-product and the basic aqueous solution to prevent hydrolysis. The polyalkylenamide product may be recovered, if desired, from the organic phase by distillation. The organic phase as well as the recovered product contains less than one weight percent active chloride impurity, usually less than 0.5 weight percent chloride, calculated as chlorine. As produced, the azirane or imine ring content of the product is at least 95, usually 98 or better, percent of theoretical. In almost any preparation, however, there will be a small amount of halide impurity present, generally not less than about 0.1 weight percent. It has been found that the product, to be stable and capable of controlled reactions such as polymerizations and crosslinking reactions, must have at least 85, preferably 90, percent of the theoretical azirane ring content. A reaction product as produced containing more than about one weight percent halide (calculated as the halogen) correspondingly contains less than 85 percent of the theoretical amount of the azirane ring corresponding to the polyalkylenamide produced. Such a product is unstable and rapidly and progressively decreases in ring content on aging of not more than a few days at most until a point of lower ring content is reached where the rate of degradation of the product markedly increases. Products containing two to six percent halogen contain less than 70 percent theoretical ring content as produced and are rapidly degraded on aging. Such impure products cannot be heated without conversion and degradation of all of the polyalkylenamide to other products. Nor can such products undergo controlled reactions with other reactants.

The above phenomena observed on impure aliphatic polyalkylenamides is not clearly understood nor are the resulting products of the conversion known with certainty, but it is believed that the hydrogen chloride formed in the reaction for making the product reacts with an azirane or imine ring of the polyalkylenamide to produce beta-chloroalkylpolyamide, which itself acts as an ionic-type promoter and chain terminator to cause production of addition and degradation products with the remaining polyalkylenamide. The concentration of the beta-chloroalkylpolyamide, such as beta-chloroethylpolyamide, progressively increases until it reaches a certain concentration at which the conversion of the remaining polyalkylenamide becomes autocatalytic under the conditions of storage. Heating the product, of course, would cause rapid degradation and decomposition to occur at a much lower concentration of beta-chloroalkylpolyamide.

The pure and isolated products of this invention as above defined and described are stable in isolated form from 3 to 6 weeks or longer under ambient temperature conditions while the pure products kept under refrigeration of 5 to 10° C. are stable from about 6 months to one year. In organic solutions the pure polyalkylenamides of this invention are stable substantially indefinitely. Incidentally, the decomposition or conversion of impure products cannot be arrested materially by the above methods. The pure and stable aliphatic polyalkylenamides of this invention can be heated to a temperature of from 100 to 120° C. or higher, depending on the particular polyalkylenamide, without substantially any degradation, decomposition or addition product formation taking place. The product will, however, sometimes polymerize slowly at such temperatures, again depending on the particular product. In contradistinction, when impure aliphatic polyalkylenamides produced by classical procedures are heated, vigorous decomposition occurs.

The compounds of this invention are characterized by two highly reactive ethylenimine rings for each molecule which open when the compounds are subjected to heat or the action of an acidic or basic promoter to produce a polymeric resinous material. These polymeric materials have varied uses as plastics in the form of gaskets, O-rings, tubing, protective films, etc., resinous castings, potting compositions, as coatings for fabric, paper, plastics and various surfaces, and as adhesives. Homopolymers of this invention vary from flexible to extremely hard and scratch-resistant polymers having three-dimensional structures. They undergo a minimum of shrinkage during polymerization. The adhesion of these homopolymers to glass and ceramics is particularly outstanding. In addition to producing homopolymers of the compounds according to this invention, copolymers can be produced by copolymerizing the compounds with other compounds having reactive functional groups containing active hydrogens by virtue of its two highly reactive alkylenimine groups. The active hydrogen of the coreactant must be capable of transferring to the nitrogen atom of the imine ring, thus resulting in the conversion of the polyalkylenamide into a bi-functional reactant with the opening of the imine ring. The polyalkylenamides of this invention are also capable of acting as crosslinking agents for linear thermoplastic and elastomeric polymers to produce a three-dimensional polymer network, thereby providing solid materials having excellent physical and chemical properties, where such polymers contain active hydrogens.

Among the N,N'-bis-1,2-alkylenamides in accordance with this invention are

N,N'-bis-1,2-ethylenadipamide;
N,N'-bis-ethylenpentadecyladipamide;
N,N'-bis-1,2-butylenadipamide;
N,N'-bis-1,2-ethylenipimelamide;
N,N'-bis-ethylene thiodipropionamide;
N,N'-bis-ethylene oxydipropionamide;
N,N'-bis-1,2-ethylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2,-butylensuberamide;
N,N'-bis-1,2-ethylenazelaamide;
N,N'-bis-1,2-propylenazelaamide;
N,N'-bis-1,2-butylenazelaamide;
N,N'-bis-1,2-ethylendodecanoyldicarboxylic acid amide;
N,N'-bis-1,2-ethylenetetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide;
N,N'-bis-1,2-pentylensebacamide;
N,N'-bis-1,2-ethylene nonadecanediamide; etc.

Mixtures of these compounds may be produced by employing mixed 1,2-alkylenimines in producing the compounds of this invention in accordance with the process of this invention.

Homopolymers and copolymers of the above compounds may be produced by heating, in the absence of a catalyst or promoter, the monomer or mixtures thereof to a temperature of up to about 150° C., usually above 70° C. or 80° C., depending upon the time required for polymerization, or polymerization may be conducted at lower temperatures, such as at room temperature, by employing from about 0.1 to about 3 weight percent of an acidic or basic promoter or initiator, such as a sulfonic acid, p-toluenesulfonic acid, or an amine, such as ethylendiamine, or other such promoter as hereinafter described.

The N,N'-bis-1,2-alkylenamide compounds of this invention form clear, transparent, amorphous, thermosetting resins having relatively high heat distortion temperatures, which do not shrink during curing or thereafter and which have excellent adhesion to a variety of structural materials. The compounds of this invention polymerize easily and controllably at, and well above, their melting points.

The polymers of the polyalkylenamides of this invention have utility in encapsulating resins for electronic circuits where it is often necessary to inspect the encapsulated components. Additionally, transparency of the polymeric resin is often needed for other reasons such as, for example, in optical adhesives where transparency both enhances appearance and permits necessary transmission of light. The ease of bulk polymerizing the monomers in accordance with this invention is also desired to obtain a 100% solids resin syrup which will pour at relatively low temperatures and yet cure in place without appreciable bubbling or shrinking.

These advantageous properties of the monomers and their polymers, produced in accordance with this invention, enable the synthetic resin art to provide superior coatings, castings and adhesives, etc.

In accordance with the process for producing the polyalkylenamides of this invention in a stable and pure form, an alkylenimine or a mixture of two or more alkylenimines, desirably containing not more than 6 carbon atoms, such as ethylenimine, 1,2-propylenimine, 1,2-butylenimine, 1,2-pentylenimine, 1,2-hexylenimine, 1,1-dimethyl-ethylenimine, etc., is reacted with an aliphatic dicarboxylic acid halide, such as the chloride or bromide, containing 6 to about 20 carbon atoms, such as adipoyl dichloride, isosebacoyl dichloride, sebacoyl dichloride, suberoyl dichloride, azelaoyl dichloride, tetradecanoyl dichloride, dodecanoyl dichloride, hexadecanoyl dichloride, octadecanoyl dichloride, thiodipropionyl dichloride, oxydipropionyl dichloride, etc., to produce the substantially pure N,N'-bis-1,2-alkylenamide of the invention and hydrogen halide as a by-product. The alkylenimine is employed in a ratio of about 2 moles for each mole of the acid polyhalide. Advantageously, an excess of alkylenimine, such as about 5 percent by weight, over and above this ratio may be employed, although an excess of about 15 to 25 weight percent may be employed. Halides of aliphatic polycarboxylic acids having above about 20 carbon atoms may also be used within the scope of this invention.

Desirably, the alkylenimine is dissolved, either partially or wholly, in an aqueous solution which also contains an ammonium or alkali metal carbonate, such as sodium, potassium or lithium carbonate, which acts as an acid acceptor to neutralize the hydrogen halide formed during the reaction of the process. When the aliphatic dicarboxylic acid halide reactant contains about 6 carbon atoms, e.g. adipoyl dichloride, the aqueous solution containing the dissolved alkylenimine preferably contains larger quantities of, and is usually saturated with, the acid acceptor salt, since the solubility of the otherwise water soluble polyalkylenamide product is greatly reduced thereby and the product thus tends to concentrate selectively in the organic solvent phase. Where the aqueous phase is essentially saturated with the acid acceptor salt, the solubility of the alkylenimine in the aqueous phase is also reduced, and a third phase, i.e. an alkylenimine phase, may therefore also be present. When a higher 1,2-alkylenimine than ethylenimine, i.e. one containing more than 2 carbon atoms, is employed, an alkali metal bicarbonate, such as sodium, potassium or lithium bicarbonate, may be used as the acid acceptor instead of the carbonate. This aqueous solution is intimately mixed with the acid polyhalide which is dissolved in a substantially water-immiscible organic solvent which is chemically inert to both the reactants and the reaction products (one not having an active hydrogen). The reaction appears to take place at the interface between the immiscible liquids, the product of reaction being dissolved in the organic solvent phase, in which its solubility is greater than in the aqueous phase, thereby being isolated from the hydrogen halide in the aqueous phase. The polyalkylenamide reaction product is obtained in high yield from the organic solvent, in which it collects as the reaction proceeds, by evaporating the solvent. This process of producing the compounds of this invention has been found to be the only one which effectively minimizes attack on and decomposition of the polyalkylenamide product by hydrogen halide formed during the course of the reaction.

It has been discovered that in producing the N,N'-bis-1,2-alkylenamides of ethylenimine pH control of the reaction mixture is more critical than where alkylenimines containing more than 2 carbon atoms are employed. Thus, in such cases it is important to employ an alkali-metal carbonate as the acid acceptor in an amount sufficient to neutralize all of the hydrogen halide formed during the progress of the reaction and yet maintain the pH of the reaction mixture at about 8.5 or above. With alkylenimines containing more than two carbon atoms, on the other hand, an alkali-metal bicarbonate may be employed instead of an alkali-metal carbonate as the acid acceptor, so long as sufficient bicarbonate is present to neutralize all of the hydrogen halide formed. This phenomenon is believed to be the consequence of the greater reactivity of polyethylenamide products when compared to those polyalkylenamide products containing alkyl substituents.

The prevention of decomposition of the aliphatic polyalkylenamides by the hydrogen halide formed during the process which this process provides is critical to the production of stable monomer product in useful amounts. These polyalkylenamides of this invention containing the C=O group, unlike those derived from sulfonic acid halides and alkylenamines, react, even at low temperatures, with hydrogen halide, particularly hydrogen chloride, to irreversibly open the terminal imine rings to form beta-haloalkylpolyamides, such as beta-chloroalkylpolyamides. These beta-haloalkylpolyamides are believed to act as powerful ionic-type catalysts and chain terminators for alkylenamines and polyalkylenamides, and this is probably the reason the presence of halogen in combined form in the polyalkylenamide product is detrimental to the product stability.

Protection of the polyalkylenamides from attack by the hydrogen halide is further complicated by the necessity of utilizing an alkali as an acid acceptor to take up or neutralize the hydrogen halide as it is formed, since an excess of certain alkalies, notably the strong alkali metal hydroxides, such as sodium and potassium hydroxides, cause hydrolysis and consequent formation of beta-hydroxyalkylpolyamides unless the temperature of the reaction is kept below about −5° C., and react irreversibly even in dilute solutions with beta-haloalkylpolyamides with the formation of oxazoline derivatives.

The interrelated and detrimental side reactions of the alkalies and hydrogen halide on the products of the invention are effectively minimized or prevented by the process of the invention. The success of this process is believed to be dependent upon a combination of factors. Since the dicarboxylic acid halides which are dissolved in the organic phase are immiscible with the water phase, the polyalkylenamide product is believed to form only at the interfaces between the organic solvent and aqueous phases, and being less soluble in the aqueous phase than in the selected organic solvent, selectively and immediately passes into the organic solvent phase. Conversely, the hydrogen chloride formed during the course of the reaction, being very water soluble, remains in the aqueous phase where it combines with the ammonium or alkali metal carbonate or bicarbonate at a rate sufficient to prevent combined chlorine contamination of the product and consequently prevent cleavage or opening of the alkylenamine rings and also the formation of oxazoline derivatives. Regardless of the accuracy of this theory, the process produces stable aliphatic polyalkylenamides in yields often exceeding 90 percent of theoretical and containing less than about 1 percent by weight of active halogen impurity and, at most, negligible amounts of beta-hydroxyalkylpolyamides.

As noted hereinbefore, the presence of active chlorine in combined form in the N,N'-bis-1,2-alkylenamide product is detrimental to the stability of the product. In the course of practicing this invention it has been found that the presence of combined halogen or chlorine impurity or contaminant in amounts as low as 2 to 5 weight percent, calculated as elemental chlorine, has been found to be detrimental to product stability. Consequently, it is preferred that chlorine contamination of the product be maintained at a value at or below about 1 weight percent. This is readily accomplished by the process of this invention without resorting to expensive and cumbersome purification procedures, even if such procedures were possible.

The ability to provide products in accordance with the invention which are relatively pure in the sense of being relatively free from combined chlorine impurity and other unwanted by-products from the process of preparation, is extremely important. This purity is reflected in excellent storage and pot life characteristics. Without it, it has not been possible to obtain the useful products described herein. For example, the impure polyalkylenamides are not capable of chain extension reactions with prepolymers, such as carboxylic terminated polyesters, to form high molecular weight polymers, since the classical preparation procedures result in a product mixture generally having less than about 85% of the theoretical azirane ring content. The impurities in polyalkylenamides tend to act as chain terminators and thus prevent the chain extension reaction necessary for useful high molecular weight polymers. To further illustrate, it is possible to extend the chain of a linear, liquid polyester (M.W. of about 3000) with the polyalkylenamides of this invention, to a high molecular weight solid polymer (M.W. of about 30,000 or higher).

Desirably, the process of producing the products of this invention is carried out at a temperature from about $-5°$ to $+30°$ C., preferably below about $+15°$ C. With the lower polyalkylenamides, i.e. produced from aliphatic dicarboxylic acid halides having about 6 carbon atoms, the preferable temperature is between about $-5°$ C. to about $+5°$ C. Although lower temperatures may be employed, there is no advantage in so doing, since they require additional expensive refrigeration or other cooling equipment. At higher temperatures, reduction in yield of product by hydrolysis and oxazoline formation is sometimes encountered.

Although any of the alkali-metal carbonates and bicarbonates may be employed as acid acceptors in the instant process, ammonium, sodium and potassium carbonates and bicarbonates are preferred.

Among the substantially water-insoluble inert organic solvents which may be employed at the temperature of reaction are the aromatic halogenated and oxygenated hydrocarbons, such as chloroform, methylchloroform, benzene, toluene, xylene, diethylether, trichloroethylene, etc. Chloroform, trichloroethylene, benzene and toluene are the preferred solvents. When the products are derved from dicarboxylic acid halides having about 6 carbon atoms, the preferred solvents are chloroform and benzene.

The requirements for the organic solvents to be used as the organic phase of the reaction are that it must be immiscible with the aqueous phase, be capable of dissolving a reasonable amount of the reactant acid chloride (such as 15 to 30 weight percent or higher before saturation at the temperature of reaction), and be more capable of selectively dissolving and containing the product than the aqueous phase. As previously stated, these solvents, particularly the preferred solvents, are excellent for storage of the products of this invention for extended periods of time. In case of storage, the solution should be as anhydrous as possible, such as can be obtained by drying the product solution with a molecular sieve or with calcium sulfate. The solvents should preferably have high volatility to facilitate separation of the product therefrom by distillation or evaporation. In general, the selection of the proper solvent for the particular product to be produced is best accomplished by trial and error, with the above requirements controlling.

The products of this invention can be dissolved in many solvents, such as the hydrocarbons, at elevated temperatures, e.g. at or near the boiling point of the solvent. Such technique may be used for recrystallization purposes to remove substantially all traces of impurities from the product.

The products of this invention may be homopolymerized or copolymerized by merely heating them to a temperature of up to about 150° C. The rate of polymerization may be enhanced by employing an acidic or basic initiator or an active hydrogen containing compound. Either weak or strong acids and bases may be used. Among the acids are the heavy metal chlorides, such as zinc or lead chlorides, the mineral acids, such as hydrochloric, sulfuric or phosphoric acids, sulfonic acids, such as p-toluene-sulfonic acid, and other acids, such as boron trifluoride molecular addition product with monoethylamine. Among the bases are the amines, such as ethylene diamine or monoethanolamine. Among the active hydrogen compounds are, for example, the hydrazides, such as isophthaloyl dihydrazide. Even water will serve as a polymerization initiator. Copolymers or chain extension of prepolymers may be produced by heating the polyalkylenamide in accordance with this invention with other monomers having at least two reactive hydrogen atoms, such as the epoxy monomers, amines, such as the primary monoamines and primary and secondary diamines and triamines, polycarboxylic acids, polymercaptans, polyalcohols, such as castor oils, sugars, glycols, and triols, phenols, and other monomers having a plurality of reactive functional groups. Examples of some particularly useful comonomers are aniline, metaxylylene diamine, piperizine, triethylene tetramine, tetraethylene glycol, Emery dimerized and trimerized acids (e.g. Empol 1022, Emery Industries, Cincinnati, Ohio), hexamethylene dimercaptan, hydroquinone, etc.

The polyalkylenamides of this invention may also be copolymerized or crosslinked with other polymers or synthetic resins which contain active hydrogen or groups in reactive form, such as urea-formaldehyde polymers, phenolic resins, polysulfide polymers, polyamide polymers, epoxy resins, and polyester polymers containing free carboxyl groups or hydroxy groups. The copolymerization reaction can also serve as a mechanism for chain extension of the reactive polymer. The alkyl polyalkylenamides above ethylene are less reactive than the ethylene polyamides; and, therefore, generally require somewhat more severe conditions for reaction and polymerization. In this respect, these higher alkylene polyamides have a tendency to be more stable than the ethylene polyamides of this invention and are therefore generally easier to handle and store. Some of these alkyl polyalkylenamides, such as poly-1,1-dimethylethylenamide, are relatively inert and, therefore, may be used as lubricants and plasticizers.

In order to more clearly disclose the invention, the following examples illustrating the process, products and compositions in accordance with this invention will now be described. It should be understood, however, that this is done solely by way of illustration.

The terms and expressions which have been employed are used as terms of description and not of limitation, and it is not intended, in the use of such terms and expressions, of excluding any equivalents of the features shown and described or portions thereof, but it is recognized that various modifications are possible within the scope of the invention claimed.

EXAMPLE 1

A 300 ml. three-necked flask was equipped with a stirrer, thermometer, condenser and dropping funnel. To the flask was added 50 ml. of water, 27.6 gm. (0.2 M) $K_2CO_3$, and 9.0 gm. (0.21 M) of ethylenimine. The mixture was stirred and cooled to $-1°$ C. and a solution of 18.3 gm. (0.1 M) of adipoyl chloride in 100 ml. of benzene was added dropwise with stirring and cooling. The temperature was maintained at 0–5° C. during the addition and while stirring for an additional period of one hour. The benzene layer was then separated, dried over a molecular sieve, filtered and evaporated to constant weight under vacuum. 17.1 gm. of a white solid product were obtained, corresponding to an 87% yield of N,N'-bis-ethylenadipamide, M.P. 37–39° C. Analysis in percent by weight:

Calculated: N◁, 42.8; Cl, 0.0.
Found: N◁, 40.1; Cl, 0.9.

This corresponds to an azirane ring content of 94 percent of theoretical.

EXAMPLE 2

To a 1000 ml. three-necked flask equipped with a stirrer, thermometer, condenser and dropping funnel, was added 200 ml. of water, 41.4 gm. (0.3 M) $K_2CO_3$ and 10.75 gm. (0.25 M) of ethylenimine. The mixture was stirred and cooled to 10° C. and a solution of 21.5 gm. (0.1 M) of crude thiodipropionyl chloride in 100 ml. of chloroform was added dropwise with stirring and cooling over a period of 30 minutes. The temperature was maintained at 10–12° C. during the addition and was then allowed to reach room temperature during an additional hour of stirring. The chloroform layer was then separated and evaporated to constant weight under vacuum. 18 gms. of an amber solid product were obtained, corresponding to 79% yield. Crystallization of N,N'-bis-ethylene thiodipropionamide from diethyl ether gave a white solid melting at 51–52° C. Analysis in weight percent:

Calculated: N◁, 36.8; S, 14.00; N, 12.28.
Found: N◁, 33.9; S, 14.02; N, 12.10.

This corresponds to an azirane ring content of about 92%.

A sample of the N,N'-bis-ethylene thiodipropionamide was heated to 120° C. for one hour. A transparent, hard, scratch resistant amorphous homopolymer resulted.

EXAMPLE 3

A 1000 ml. three-necked flask was equipped with a stirrer, thermometer, condenser and dropping funnel. To the flask were added 400 ml. of water, 55.2 gm. (0.4 M) $K_2CO_3$ and 13.3 gm. (0.31 M) of ethylenimine. The mixture was stirred and cooled to 10° C. and a solution of 54.7 gm. (0.15 M) of crude nonadecanoyl dichloride in 200 ml. of benzene was added dropwise with stirring and cooling over a period of 70 minutes. The temperature was maintained at 10–12° C. during the addition and thereafter allowed to reach room temperature during an additional one hour of stirring. The benzene layer was separated, dried over a molecular sieve, filtered and evaporated to constant weight under vacuum. 50.8 gm. of semi-solid N,N'-bis-12-ethylene nonadecanediamide were obtained, corresponding to 90% yield. Analysis in percent by weight:

Calculated: N◁, 22.8; Cl, 0.0.
Found: N◁, 20.4; Cl, 0.2.

This corresponds to an azirane ring content of about 90% of theoretical.

EXAMPLE 4

A 500 ml. three-necked flask was equipped with a stirrer, thermometer, condenser and dropping funnel. To the flask were added 75 ml. of water, 27.6 gm. (0.2 M) $K_2CO_3$ and 7.8 gm. (0.17 M) of ethylenimine. The mixture was stirred and cooled to 10° C. and a solution of 31.5 gm. (0.08 M) of a mixture of alpha and beta-pentadecyladiopoyl dichloride in 150 ml. of benzene was added dropwise with stirring and cooling over a period of 50 minutes. The temperature was maintained at 10–12° C. during the addition and thereafter allowed to reach room temperature while stirring for an additional hour. The benzene layer was separated, dried over a molecular sieve, filtered, and evaporated to constant weight under vacuum. 25.2 grams of a yellow liquid product, corresponding to 77.5% yield of N,N'-bis-1,2-ethylenepentadecyladipamide, were obtained. The refractive index, $n_D^{25}$, of the product was 1.4782.

EXAMPLE 5

To a 2,000 ml. three-neck reaction flask equipped with a stirrer, a thermometer, a condenser and dropping funnel were added 110 grams of potassium carbonate, 800 grams of water and 43 grams of ethylenimine. The mixture was stirred until a solution was obtained which was then cooled to about 15° C. To the resulting solution was added dropwise with cooling and vigorous stirring a solution of about 95.6 grams of isosebacoyl dichloride prepared from "isosebacic acid" (a product of the U.S. Industrial Chemical Company consisting of 72–80% of 2-ethylsuberic acid, 12–18% of 2,4-diethyladipic acid and 6–10% of n-sebacic acid) dissolved in 400 ml. of diethyl ether. During this time the temperature of the mixture was maintained below 15° C. and the acid chloride added at a rate of approximately one gram per minute. The reaction mixture was allowed to warm gradually to room temperature, while stirring, for an additional hour. During the total reaction period, the pH of the reaction mixture dropped from approximately 12.5 at the beginning of the reaction to about 8.6 at the end. The ether layer was separated, dried over solid anhydrous sodium hydroxide at 0° C. for one hour, the sodium hydroxide removed by filtration and the ether removed from the filtrate under reduced pressure. The resulting reaction product, N,N'-bis-1,2-ethylenisosebacamide, remained as a water-white liquid. The yield was 93 grams or 93% of the theoretical. When subjected to analysis the product was found to contain 10.8% nitrogen and 33.3% azirane radical as compared with the calculated values of 11.1% and 33.3%, respectively.

EXAMPLE 6

To a 5-gallon glass-lined, water-jacketed, reaction kettle, equipped with a stirrer, were added the following materials:

1.05 pounds ethylenimine
0.53 pound potassium hydroxide (100% solids present as an inhibitor in the original ethylenimine solution)
0.94 pound potassium bicarbonate (to convert the potassium hydroxide to potassium carbonate)
2.92 pounds potassium carbonate
16.5 pounds water After a solution had formed, a second solution of 2.52 pounds of crude isosebacoyl dichloride (as described in Example 5) dissolved in 9.3 pounds of technical grade benzene was added with stirring over a period of 65 minutes during which time the temperature was maintained at between about 14 and 17° C. The reaction mixture was stirred for an additional two hours during which time the temperature rose to about 25° C. During the reaction period of the pH dropped from about 12.5 at the beginning to about 9.7 at the end. The benzene layer was separated, dried over anhydrous calcium sulfate which was removed by filtration and the benzene removed by vacuum distillation. A yield of 2.58 pounds (97% of theoretical) of N,N'-bis-1,2-ethylenisosebacamide was obtained. When subjected to analysis, it was found to contain 0.3% chlorine and 32.2% azirane radical as compared to calculated values of 0% and 33.3%, respectively.

The room temperature stability of the N,N'-bis-1,2-ethylenisosebacamide produced in accordance with this example was tested by analyzing for the amount of azirane radical remaining after various periods of storage at room temperature (about 21° C.). The results are given below in the following table.

| Length of storage at room temperature: | Azirane radical found, percent of theoretical |
|---|---|
| 2 days | 100 |
| 2 weeks | 100 |
| 1 month | 100 |
| 2 months | 95 |
| 3 months | 76 |

This test of azirane ring breakdown enables one to determine the stability of the monomer. As indicated by the results reported in the table, the monomer of the example is of excellent stability.

EXAMPLE 7

To a 500 ml. three-neck reaction flask, equipped with a stirrer, thermometer, condenser and dropping funnel were charged a solution of about 55.2 grams of potassium carbonate and 15.8 grams of 1,2-butylenimine in 200 ml. of water. The solution was stirred and cooled to about 4° C. To the cooled solution was added dropwise, with stirring and cooling, over a period of 23 minutes, a solution of about 23.9 grams of isosebacoyl chloride dissolved in 100 ml. of diethylether. During the addition, the temperature of the reaction mixture was maintained at about 4–8° C. After the addition was completed, the mixture was allowed to warm gradually to room temperature (21° C.) and stirring was continued for 12 hours. During the course of the reaction the pH dropped from 12.5 at the begining to about 10.0 at the end. The ether layer was separated and dried by storing over anhydrous sodium hydroxide pellets for 1 hour at 0° C., the pellets were removed by filtration and the ether evaporated. The resulting N,N'-bis-1,2-butylenisosebacamide remained as a water-white liquid. The yield was 28.4 grams, 92% of theoretical. When subjected to analysis the product was found to contain 0.6% chlorine and 43.1% 2-ethylazirane radical as compared with the calculated values of 0% and 45.5%, respectively. The product did not change in appearance or viscosity after standing at room temperature for six months.

EXAMPLE 8

The procedure of Example 5 was repeated except that 95.6 grams of sebacoyl dichloride were employed in place of the isosebacoyl dichloride. During the course of the reaction the pH dropped from about 12.5 at the beginning to about 8.6 at the end. The product obtained was N,N'-bis-1,2-ethylensebacamide which was a white crystalline product having a melting point of 59.5–61° C. with no purification being necessary. The yield was 95 grams or 95% of the theoretical. The product was found to contain 10.9% nitrogen compared with the calculated value of 11.1%. The high degree of room temperature stability of the monomer is shown by the data obtained when the azirane ring content was determined over different periods of storage. The data are given below.

| Duration of storage at room temperature: | Azirane ring content (percent of theoretical) |
|---|---|
| 0 days | 96 |
| 1 month | 96 |
| 2 months | 96 |
| 4 months | 96 |

EXAMPLE 9

To a 30 gallon glass-lined reaction kettle were added the following materials:

88.14 pounds water
5.28 pounds ethylenimine
3.08 pounds potassium hydroxide
5.50 pounds potassium bicarbonate (to convert the potassium hydroxide to potassium carbonate)
7.47 pounds potassium carbonate After a solution had formed, a second solution of 13.05 pounds of sebacoyl dichloride dissolved in 79 pounds of trichloroethylene was added slowly with stirring during which the temperature of the mixture was maintained at a temperature of about 14 to 17° C. The reaction mixture was stirred for an additional 2 hours during which time the temperature rose to 25° C. The organic layer was separated, dried over anhydrous calcium sulfate and the trichloroethylene removed by vacuum distillation. A yield of 13.0 pounds (90.5% of theoretical) of N,N'-bis-1,2-ethylensebacamide having a melting point of 59–61° C. was obtained. When subjected to analysis the product was found to contain 0.8% chlorine and 32.4% azirane radical as compared to calculated values of 0% and 33.3%, respectively.

EXAMPLE 10

The procedure of Example 5 was repeated replacing the isosebacoyl dichloride with an equivalent amount of azelaic acid dichloride. The product, N,N'-bis-1,2-ethylenazelaamide was recovered as a white crystalline product having a melting point of 44–46.5° C.

EXAMPLE 11

To a 500 ml. three-neck reaction flask equipped with a stirrer, a thermometer, a condenser and dropping funnel were added 22.1 grams of potassium carbonate, 180 grams of water and 8.6 grams of ethylenimine. The mixture was stirred until a solution was obtained which was then cooled to about 15° C. To the resulting solution was added dropwise with cooling and vigorous stirring a solution of about 21.7 grams of tetradecanoyl dichloride (crude) dissolved in 90 ml. of chloroform. During this time the temperature was maintained below 15° C. The reaction mixture was allowed to warm gradually to room temperature, while stirring, for an additional hour. During the total reaction period the pH of the reaction mixture dropped from approximately 12.3 at the beginning of the reaction to about 8.3 at the end. The chloroform layer was separated, dried over anhydrous sodium sulphate and the chloroform removed under reduced pressure. The resulting reaction product, N,N'-bis-1,2-ethyl-endodecane dicarboxylic acid amide remained as a tan-colored solid that was crystallized from cyclohexane and had a melting point of 74–76° C. The yield was 21.6 grams or 95% of the theoretical. When subjected to analysis the product was found to contain 8.9% nitrogen as compared with the calculated value of 9.1%.

EXAMPLE 12

To a 500 ml. three-neck reaction flask equipped with a stirrer, a thermometer, a condenser and dropping funnel were added 200 ml. of water, 55.2 grams (0.4 mole) of potassium carbonate and 11.4 grams (0.2 mole) of 1,2-propylenimine. The resulting solution was stirred and cooled to 15° C., and a solution of 23.9 grams (0.1 mole) of sebacoyl dichloride dissolved in 100 ml. of ether was added dropwise with cooling and stirring over a period of 22 minutes. The temperature was maintained at 14–16° C. during the addition. The stirring was continued for an additional six hours, during which time the reaction mixture was permitted to reach room temperature. The ether layer was separated, dried over solid sodium hydroxide at 0° C. for one hour and the ether evaporated to give 27.3 grams of N,N'-bis-1,2-propylensebacamide, for a yield of 98%. The product was a white crystalline solid having a melting point of 31.5–32.5° C. and having a 2-methylazirane radical content of 40.6% compared to the calculated value of 40.0%.

EXAMPLE 13

To a 500 ml. three-neck reaction flask equipped with a stirrer, a thermometer, a condenser and dropping funnel were added 200 ml. of water, 21.8 grams (0.218 mole) of potassium bicarbonate and 11.9 grams (0.21 mole) of 1,2-propylenimine. The mixture was stirred until a solution was obtained which was then cooled to 15° C. To this solution was added a solution of 23.9 grams (0.1 mole) of isosebacoyl dichloride dissolved in 100 ml. of benzene with stirring over a period of 20 minutes, during which time the temperature was maintained at about 14–16° C. The reaction mixture was then stirred for an additional hour at room temperature. The benzene layer was then separated and evaporated to give 22.1 grams of N,N'-bis-1,2-propylenisosebacamide, for a yield of 88% of the theoretical. The product was a water-white liquid which, upon analysis, was found to contain only 0.4% chlorine.

EXAMPLE 14

A sample of N,N'-bis-12-ethylenadipamide prepared by the procedure of Example 1 was converted from powder form to the melt and then to a film by heating in the 150–350° F. range. One curing at 275° F. for 30 minutes produced a hard, clear resin which had good adhesion to the substrate material. Coatings of this type were made on steel and wood. The coatings on soft, open-grain wood, such as fir, gave good penetration on melting and on curing brought out the grain and had a hardening and filling effect.

For purposes of comparison, 36 grams of N,N'-bis-1,2-ethylenadipamide were prepared in a 92% yield using the classical preparation procedures described earlier (single phase organic solvent system). The product analysis in weight percent was:

Calculated: N◁, 42.8; Cl. 0.0.
Found: N◁, 32.1; Cl. 1.8, M.P. 32–35° C.

This corresponds to an azirane ring content of 75% of theoretical. When 1.5 grams of this material were placed in a 248° F. (120° C.) oven in an attempt to obtain a hard, clear transparent resin, vigorous decomposition occurred after three minutes, filling the oven with brown fumes and leaving a charred residue.

EXAMPLE 15

Equivalent portions of the N,N'-bis-1,2-ethylene adipamide prepared in accordance with Example 1 and the water soluble condensation product of methylol urea and melamine (Aerotex Resin M–3, equivalent weight about 50–100, product of American Cynamid) were placed under a heat lamp at a distance of 3 to 4 inches. The resulting reaction product after a 10–15 minute exposure was a clear, tacky resin which displayed pressure sensitive properties. A small amount of this reaction product was coated on a filled paper, one-half inch in width. On peel back, the copolymeric product showed the typical "legging" or stringing effect of a good pressure sensitive adhesive.

EXAMPLE 16

To an 80 weight percent aqueous solution of Aerotex M–3 resin was added N,N'-bis-1,2-ethylenadipamide in the weight ratio of 1 part of the adipamide to 10 parts of the resin. The adipamide dissolved to form a homogeneous solution with the resin. After 5–10 minutes under the infrared heat source polymerization started. The water soluble lacquer was then coated onto paper, wood and aircraft aluminum and they were further cured for 45 minutes at a temperature of about 250° F., using an infrared source. An additional quantity of the resin mixture was used as an adhesive for two pieces of clear fir, proir to the final cure. In the case of the adhesive the final cure was effected by heat transmission through the 1/16 inch thick wood.

In the final cured state the coating on wood was clear, tough and effective in emphasizing the wood grain structure. Such a clear, water soluble varnish or lacquer is particularly unique in having a low viscosity and high solids content. Although heat curing was employed, this is a matter of convenience, since this resin mixture can be cured at room temperature.

The cured paper coating was non-tacky and gave good transparency to the base paper (Huribut 720–B), which properties are desirable in glassine type papers or in tracing papers. In producing a tracing paper the coating was lighter and was almost completely taken up or absorbed in saturating the fiber structure.

The coating on aircraft aluminum had excellent clarity and was scratch resistant. The sample could be bent or flexed through 90° without flaking of the surface. Here also, the advantages of a high solids, water based system, which can be cured at room temperature with no flammability hazard from solvents.

Similar coatings were also made with the addition of pigments, such as titanium dioxide, where greater hardness or color is desired. Coloring pigments and fillers may also be included.

EXAMPLE 17

An approximate stoichiometric mixture of the N,N'-bis-1,2-ethylenadipamide prepared as in Example 1 and N,N'-diethyl ethylene diamine was made and subjected to a temperature of 240° F. for one hour. A tough semi-elastomeric resin was formed.

EXAMPLE 18

Approximately stoichiometric amounts of the N,N'-bis-1,2-ethylenadipamide made as in Example 1 and N-methyl cyclohexyl amine were admixed and heated for about one hour at 240° F. The partially polymerized mixture was then used as an impregnant for clear fir wood, emphasizing the grain quality of the wood. By further heating it cured to the finished state, producing a tough, scratch resistant wood surface.

Similar results were obtained with the substitution of N(2-amino ethyl) piperazine for N-methyl cyclohexyl amine, the resulting resin being particularly hard and impact resistant.

EXAMPLE 19

Approximately stoichiometric quantities of N-butyl amine and N,N'-bis-1,2-ethylenadipamide were heated for one hour at 240° F. A copolymeric product resulted which possessed good pressure sensitive adhesive behavior. This adhesive was coated onto a strip of paper and a roll of tape formed. On application of the tape to a flat surface the adhesive showed greater cohesive strength than the paper. When this adhesive product is coated on wood and metal and further cured, it loses its tacky properties and hardens to a tough resin coating. Paper (Hurlbut–720B) treated with the adhesive product becomes more transparent, which property is maintained after further curing to the non-tacky state.

EXAMPLE 20

A copolymer of aniline and N,N'-bis-1,2-ethylenadipamide was prepared by mixing together approximately stoichiometric quantities of these monomers and curing at room temperature. A very hard resin suitable for use as a room temperature setting adhesive was formed with good rapidity.

EXAMPLE 21

To 1.5 grams of N,N'-bis-1,2-ethylenadipamide prepared by the classical preparation procedures described earlier (single phase organic solvent system) was added two drops of ethylene diamine. When this mixture was subjected to the oven temperature of 248° F. for only 30 seconds, vigorous decomposition occurred, filling the oven with brown fumes and leaving a residual charred mass.

EXAMPLE 22

About 584 parts of adipic acid, 388 parts of diethylene glycol, 12.44 parts of trimethylolpropane and 2 parts of a triphenyl phosphite catalyst were charged to a stirred flask. The reaction is carried out at 160–180° C. in a nitrogen atmosphere. When approximately the theoretical amount of water of esterification had been driven off (indicating that the reaction is essentially complete) the pressure is reduced gradually and the temperature is increased to 220° C. The reaction is terminated when the acid number of the melt reaches 27.9.

The polyester as prepared above was mixed in stoichiometric quantity with the N,N'-bis-1,2-ethylene adipamide of this invention and the resulting mixture was cured at room temperature to produce a strong elastomer useful in making coated fabrics, paper saturants, printing rolls, and other products in which strength, ease of processing, good low and high temperature properties, abrasion resistance and other desirable elastomeric properties are needed. The cure can also be performed more rapidly at higher temperatures.

One of the major objections to water-based paints of the rubber type is the excessively thin, watery consistency and lack of thixotropic properties. Such paints are difficult to apply, particularly on overhead work. Textured surfaces are often impossible to obtain. Even most of the so-called texture paints suffer from the lack of good thixotropic properties unless they are loaded with granulated materials or other fillers. By using the products of this invention a standard latex type paint can be converted to a texture type paint, the water soluble polyalkylenamides, such as N,N'-bis-1,2-ethylenadipamide, effecting a chain extension and crosslinking of certain water soluble products, e.g. carboxymethyl cellulose. The following example is illustrative of this procedure.

EXAMPLE 23

A master batch of water base, latex type paint was made up by mixing 10 parts of rubberized paint (Lion Brand Tinted Satin, 308 Rose; W. H. Sweney & Co., St. Paul, Minnesota) with 1 part by weight of carboxymethyl cellulose (low viscosity type, Hercules Powder Co. Brand Type 7L). Using this master batch N,N'-bis-1,2-ethylenadipamide of this invention was added in a concentration range of 0.05 to 1 part by weight. Then this mix was thoroughly stirred and allowed to stand for 48 hours. A control sample of the master batch without the N,N'-bis-1,2-ethylenadipamide was similarly prepared for purposes of comparison.

The mix containing the adipamide had a much firmer consistency than the control and further had an excellent degree of thixotropic behavior. Comparative thixotropic behavior was noted by comparing run off from the stirrer and by painting a flat surface, both stirrers and painted surfaces having been set at about a 45° angle. The adipamide stabilized system showed markedly less tendency to run when freshly applied to a wood surface, even in very thick layers, and readily produced good textured painted surfaces with good washability characteristics. Apparently the adipamide reacts at room temperature with the carboxyl groups in the carboxymethyl cellulose to produce a crosslinked network.

EXAMPLE 24

The N,N'-bis-1,2-ethylenisosebacamide monomer produced in accordance with Example 6 was bulk polymerized to a clear, insoluble, scratch resistant film by heating the monomer at 125° C. for 2 hours. The dielectric constants (K) and dissipation factors (D) of the resulting poly-N,N'-bis-1,2-ethylenisosebacamide were measured at several frequencies with the following results:

| Frequency (cycles per sec.) | 60 | 10³ | 10⁵ | 10⁶ | 10⁷ | 3 x 10⁷ |
|---|---|---|---|---|---|---|
| Dielectric Constant (K) | 3.27 | 3.22 | 3.10 | 2.98 | 2.93 | 2.89 |
| Dissipation Factor (D) | 0.007 | 0.009 | 0.017 | 0.035 | 0.019 | 0.008 |

The product of the dielectric constant (K) and the dissipation factor (D) is a relative measure of the heat loss accompanying the passage of electrical current. This product, together with the individual values of K and D, measure the suitability of the material for use in electrical insulation, casting and potting fields. Materials with dissipation factors of 0.01–0.03 and dielectric constants of 2.8–3.5 are generally suitable for this purpose. Hence, the poly-N,N'-bis-1,2-ethylenisosebacamide of this invention is eminently satisfactory for these purposes.

EXAMPLE 25

The procedure of Example 24 was repeated after first adding a small amount of acid catalyst, p-toluene sulfonic acid, to the monomer. As a result of the catalytic action of the acid, the polymerization was complete after heating at 125° C. for less than 10 minutes. An amine catalyst, such as ethylenediamine, produced the same results.

When the same procedure was carried out, using N,N'-bis-ethylenadipamide prepared by the classical technique described earlier, vigorous decomposition occurred after only brief exposure to the oven temperature of 120° C.

EXAMPLE 26

In order to evaluate its utility as an optical cement, a sample of N,N'-bis-1,2-ethylenisosebacamide monomer produced in accordance with Example 6 was melted on a glass plate and another glass plate was placed on top of the melted monomer. The resulting sandwich was heated 1 hour at 120° C. The plates were cemented together and the bond was found to be stronger than the glass. The cement exhibited no apparent absorption of light in the visible wave-length range. The polymer provided a completely transparent bond between the two pieces of glass.

EXAMPLE 27

About 4 grams of BF₃–400 (Shell Chemical Company, a boron trifluoride molecular addition complex with monoethylamine) and 200 grams of N,N'-bis-1,2-ethylenisosebacamide were mixed together and the mixture was cured for 15 hours at 65° C., 1 hour at 85° C., 1 hour at 100° C., 2 hours at 120° C., and 3½ hours at 150° C. A clear, amber-colored homopolymer with very low shrinkage resulted. Its physical properties are given below:

Tensile strength (p.s.i.)_____ 3,035
Percent elongation at failure_____ .089
Elastic modulus in tension (p.s.i.)_____ 3,750,000
Flexural strength (p.s.i.)_____ 14,422
Elastic modulus in flexure (p.s.i.)_____ 379,000
Compressive strength (p.s.i.)_____ 34,821
Modified Vicat penetration test, ° C._____ Above 265

The value of this product as an encapsulating resin is apparent.

EXAMPLE 28

About 4 grams of BF₃–400 (Shell Chemical Company, a boron trifluoride molecular addition complex with monoethylamine) and 200 grams of N,N'-bis-1,2-ethylensebacamide were mixed together with heating and the mixture was cured for 15 hours at 65° C., 1 hour at 85° C., 1 hour at 100° C., 2 hours at 120° C. and 3½ hours at 150° C. A clear, amber-colored homopolymer with very low shrinkage resulted. Its physical properties are given below:

Tensile strength (p.s.i.)_____ 3,000
Percent elongation at failure_____ 3.5
Elastic modulus in tension (p.s.i.)_____ 191,000
Flexural strength (p.s.i.)_____ 9,753
Elastic modulus in flexure (p.s.i.)_____ 335,000
Compressive strength (p.s.i.)_____ 38,750
Modified Vicat penetration test, ° C._____ Above 250

The value of this product as an encapsulating resin is apparent.

EXAMPLE 29

About 2 parts of BF₃–400 (Shell Chemical Company, a boron trifluoride molecular addition complex with monoethylamine) and 50 parts each of N,N'-bis-1,2-ethylenisosebacamide and N,N'-bis-1,2-ethylensebacamide were mixed together at approximately 70–75° C. and the mixture was cured for 2 hours at 65° C., 1½ hours at 95° C. and 2 hours at 150° C. A clear, amber-colored polymer with very low shrinkage resulted. Its physical properties are given below.

Modified Vicat penetration test, ° C._____ 265
Rockwell hardness_____ R–89

The value of this product as an encapsulating resin is apparent.

The modified Vicat penetration test referred to in Examples 27, 28 and 29 above was conducted as follows:

The cured resin casting was submerged in an inert liquid. The flat bottom surface of a needle having a one millimeter by one millimeter cross section was pressed against the sample under a loading of 1 kilogram and the liquid was heated at the rate of 2° C. per minute. The temperature at which the needle began to penetrate the sample is the value reported.

EXAMPLE 30

About 30 parts by weight of benzoyl ethylenimine was stirred into a melt of 100 parts of N,N'-bis-1,2-ethylensebacamide monomer. The resulting solution was bulk polymerized by heating it for about 1 hour at 120° C. The resulting cured copolymer resin was clear, insoluble and inflexible. The characteristics of this copolymer render it appropriate for use as an encapsulating resin.

EXAMPLE 31

About 4.3 parts by weight of m-phenylene-diamine was warmed until it became liquid and stirred into 20 parts of N,N'-bis-1,2-ethylenisosebacamide which was at room temperature. The composition was cured overnight at room temperature to a gel. It was then further cured by heating at 50° C. for one hour and at 75° C. for another hour. A clear, amber-colored copolymer with very low shrinkage resulted. Its physical properties are given below:

| | |
|---|---:|
| Tensile strength (p.s.i.) | 14,100 |
| Percentage elongation at failure | 9.9 |
| Elastic modulus in tension (p.s.i.) | 264,000 |
| Flexural strength (p.s.i.) | 9,600 |
| Elastic modulus in flexure (p.s.i.) | 328,000 |
| Heat distortion temperature (° C.) | 80 |

An additional post cure of one hour at 150° C. raised the heat distortion temperature of the copolymer to 108° C. The value of this product as an encapsulating resin is apparent.

EXAMPLE 32

About 10 parts by weight of N,N'-bis-1,2-ethylensebacamide was melted, 1 part of ethylene diamine was stirred into the melt (2:1 molar ratio) and the mixture heated at 120° C. in an aluminum foil dish. A vigorous reaction took place after only 3 or 4 minutes. The resulting film of copolymer was clear, transparent and flexible. This combination of monomer and curing agent may be utilized as a binder of a baking type surface coating, as well as for clear protective coatings.

When the same procedure was followed using N,N'-bis-1,2-ethylensebacamide prepared by the classical preparation technique described earlier, the mixture decomposes upon heating.

EXAMPLE 33

The following Table I demonstrates the storage and degradation characteristics of the polyalkylenamides of this invention. The data shown are based on N,N'-bis-1,2-propylenisosebacamide and N,N'-bis-1,2-ethylensebacamide. These data are particularly illustrative since these aliphatic polyalkylenamides are two of the more reactive of these compounds. The table shows the relationship between the chlorine impurity content to the quantity of undecomposed or isomerized polyalkylenamide based on percent imine or azirane ring content as compared with a theoretically pure product containing only the polyalkylenamide. The percent ring content is equivalent to the amount of aliphatic bisalkylenamide in the product. Dry product was stored in glass under air at a temperature of 20° C.

Table I

N,N'-BIS-1,2-PROPYLENISOSEBACAMIDE

| Age, days | Percent Cl | Percent theoretical ring content |
|---|---|---|
| 0 | 0.3 | 90.2 |
| 28 | 0.3 | 90.2 |
| 127 | 0.3 | 84.0 |
| 0 | 1.3 | 85.0 |
| 28 | 1.3 | 77.5 |
| 127 | 1.3 | 63.0 |

N,N'-BIS-1,2-ETHYLENSEBACAMIDE

| Age, days | Percent Cl | Percent theoretical ring content |
|---|---|---|
| 0 | 0.4 | 98.0 |
| 23 | 0.4 | 97.0 |
| 85 | 0.4 | 96.0 |
| 132 | 0.4 | 96.0 |
| 178 | 0.4 | 96.0 |
| 0 | 0.6 | 97.3 |
| 23 | 0.6 | 92.2 |
| 85 | 0.6 | 84.2 |
| 0 | 1.3 | 94.0 |
| 105 | 1.3 | 71.5 |
| 0 | 2.4 | 83.0 |
| 77 | 2.4 | 56.0 |

The storage properties of these polyalkylenamides of proper purity should show at least 85 percent ring content in 23 days at 20° C. Samples showing less than 80 percent theoretical ring content at any time under any conditions are unsatisfactory and of improper purity. Solutions of the polyalkylenamides maintain their ring content over prolonged periods and represent the best manner of storing and handling the materials. The concentration of the polyalkylenamides in the solution vary with the solvent and the particular polyalkylenamide, but usually is at least about 15 weight percent and as high as 50 to 60 weight percent. The concentration as produced is about 20 to 25 weight percent and can be increased by distillation or evaporation of some of the solvent to above this value, such as 30 weight percent or higher.

EXAMPLE 34

A 500 ml. three-necked flask was equipped with a stirrer, thermometer, condenser and dropping funnel. To the flask was added 200 ml. of water, 16.5 grams (0.12 M) $K_2CO_3$ and 2.6 grams of ethylene imine. The mixture was stirred and cooled at 10° C. and a solution of 20.0 grams (0.03 M) of Emery 3020–S polymerized fatty acid chloride (produced by reaction $PCl_3$ with Emery 3020–S polymerized fatty acid, a product from the polymerization of $C_{18}$ unsaturated fatty acid having an average of 44 carbon atoms, an iodine value of 35–45, a neutralization equivalent of 295–310, a refractive index at 25° C. of 1.4858, and a monomer:dimer:trimer weight ratio of 3:72:25), in 100 ml. of benzene was added dropwise with stirring and cooling over a period of 16 minutes. The temperature was kept at 10–12° C. during the addition and then allowed to attain room temperature while stirring for an additional hour. The benzene layer was separated, dried over a molecular sieve, filtered and evaporated to constant weight under vacuum. 20.5 grams of a yellow, liquid reaction product of ethylene imine and the Emery 3020–S polymerized fatty acid chloride were obtained, corresponding to approximately 100 percent yield. The chlorine content of the product was about 0.2 weight percent. A homopolymer was prepared by heating the above product for a period of 15 hours at 120° C. to a transparent, tough, and extremely flexible resin.

The procedure for determining the imine ring content is as follows:

Weigh out sample containing 1 m.e.q. of imino (1 equivalent corresponds to 1 ethylenimino group), add to approximately 50 ml. of a neutralized (usually 2 drops 0.1 N base) 0.2 mol solution of $Na_2S_2O_3$ in 50 percent acetone containing phenolphthaline, and the mixture is heated in a flask (three-neck iodine flask) carrying a reflux condenser and a rubber stopper holding a 10 ml. burette. As the solution is heated, the pink color which develops is continuously discharged by adding 0.2 N acetic acid from the burette. When no further alkalinity is produced, generally after 15–20 minutes, the solution is cooled and any excess of acetic acid is titrated with 0.1 N NaOH.

This procedure is for water-insoluble imino compounds.

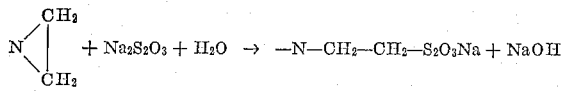

Calculations are based on the following formula:

$$\text{TV} \frac{(\text{vol. CH}_3\text{COOH}-\text{back titration})\times N\times \text{equiv. wt.}\times 100}{1000\times \text{sample wt.}}$$

= percent imino cpd.

References to method are Journal of Chemical Society, 1950, p. 2257; and for water-soluble compounds, see Anal. Chem., vol. 27, April 1955, p. 540.

Novel N,N'-bis-1,2-alkylenamides of aliphatic dicarboxylic acids within the scope of this invention generally correspond to the bis-amides of aliphatic dicarboxylic acids having from 6 to about 55 carbon atoms, the amido groups of which have the structure

wherein R is hydrogen or a lower alkyl group, i.e. one containing up to 4 carbon atoms each, such as methyl, ethyl, propyl and n-butyl, preferably containing not more than 2 carbon atoms. Some of these products have the structure:

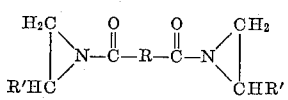

wherein R is a branched or straight chain alkylene radical containing from 4 to about 40, preferably from 4 to about 20, carbon atoms, and R' is hydrogen or a lower alkyl group, i.e. one containing up to 4 carbon atoms each, such as methyl, ethyl, propyl and n-butyl, preferably not more than 2 carbon atoms each.

As used herein, an organic compound containing active hydrogen is defined as an organic compound displaying the presence of active hydrogen in accordance with the well known Tschugaeff-Zerewitinoff analytical technique, e.g. note J.A.C.S., 49, 3181 (1927).

Various modifications and alterations in the reaction conditions may become apparent to those skilled in the art without departing from the scope of this invention. Also, numerous compounds other than those specifically disclosed can obviously be made in accordance with this invention in view of the teachings herein contained.

Having described my invention, I claim:

1. A solid high molecular weight amorphous homopolymer of a bis-(N-1,2-alkylenecarboxamide) of an aliphatic dicarboxylic acid, said acid containing from 6 to about 55 carbon atoms.

2. A solid, transparent amorphous homopolymer of bis-(N-1,2-ethylenecarboxamide) of an aliphatic dicarboxylic acid, said acid containing from 6 to about 55 carbon atoms, said amide having at least 85% of its amide groups as azirane rings.

3. A clear, solid high molecular weight amorphous homopolymer of N,N'-bis-(N-1,2-ethylene) adipamide, said amide having at least 85% of its amide groups as azirane rings.

4. A clear, solid high molecular weight amorphous homopolymer of N,N'-bis-(N-1,2-ethylene) isosebacamide, said amide having at least 85% of its amide groups as azirane rings.

5. A clear, solid high molecular weight amorphous homopolymer of N,N'-bis-(N-1,2-ethylene) sebacamide, said amide having at least 85% of its amide groups as azirane rings.

6. A clear, solid high molecular weight amorphous homopolymer of N,N'-bis-(N-1,2-butylene) isosebacamide, said amide having at least 85% of its amide groups as azirane rings.

7. A solid, high molecular weight amorphous homopolymer of N,N'-bis-(N-1,2-ethylene) dodecane dicarboxylic acid amide, said amide having at least 85% of its amide groups as azirane rings.

8. A solid, high molecular weight amorphous interpolymer consisting of monomer units corresponding to an aliphatic N-1,2-alkylenecarboxamide having a plurality of N-1,2-alkylenecarboxamide groups, at least 85% of its carboxamide groups having azirane rings, and at least one compound having a plurality of active hydrogen containing radicals selected from the groups consisting of carboxyl, hydroxyl, amino and mercapto radicals.

9. A solid high molecular weight amorphous interpolymer consisting of monomer units corresponding to a bis-(N-1,2-alkylenecarboxamide) of an aliphatic dicarboxylic acid having from six to about 55 carbon atoms, said compound having at least 85% of its carboxamide groups as azirane rings, and at least one organic compound having a plurality of active hydrogen containing radicals selected from the groups consisting of carboxyl, hydroxyl, amino and mercapto radicals.

10. A solid high molecular weight amorphous interpolymer consisting of monomer units corresponding to a bis-(N-1,2-alkylenecarboxamide) of an aliphatic dicarboxylic acid having from six to about 55 carbon atoms, said compound having at least 85% of its carboxamide groups as azirane rings, and a polyester having at least two active hydrogen atoms per molecule.

11. A solid high molecular weight amorphous interpolymer consisting of monomer units corresponding to a bis-(N-1,2-alkylenecarboxamide) of an aliphatic dicarboxylic acid having from six to about 55 carbon atoms, said compound having at least 85% of its carboxamide groups as azirane rings, and an amide having at least two active hydrogen atoms per molecule.

12. A solid high molecular weight amorphous homopolymer of an aliphatic N-1,2-alkylenecarboxamide having a plurality of N-1,2-alkylenecarboxamide groups, at least 85% of its carboxamide groups having azirane rings.

References Cited in the file of this patent

UNITED STATES PATENTS

| | | |
|---|---|---|
| 2,265,416 | Bestian | Dec. 9, 1941 |
| 2,341,413 | Pense | Feb. 8, 1944 |
| 2,708,617 | Magat et al. | May 17, 1955 |
| 2,915,480 | Reeves et al. | Dec. 1, 1959 |

FOREIGN PATENTS

| | | |
|---|---|---|
| 899,955 | France | Sept. 11, 1944 |
| 900,137 | Germany | Dec. 21, 1953 |

OTHER REFERENCES

Hendry et al.: British J. Pharmacology and Chemo., volume 6, pages 360–390, 1951.